(12) United States Patent
Fitzwater et al.

(10) Patent No.: US 6,380,326 B2
(45) Date of Patent: Apr. 30, 2002

(54) CONTINUOUS PROCESS FOR PREPARING POLYMERS

(75) Inventors: Susan Jane Fitzwater, Ambler; Dawn Marie McFadden, Newtown, both of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/811,663

(22) Filed: Mar. 19, 2001

Related U.S. Application Data
(60) Provisional application No. 60/190,618, filed on Mar. 20, 2000.

(51) Int. Cl.$^7$ ................................................ C08F 2/00
(52) U.S. Cl. ............................ 526/88; 526/72; 526/918
(58) Field of Search ........................... 526/88, 72, 918

(56) References Cited

U.S. PATENT DOCUMENTS

| | | | |
|---|---|---|---|
| 4,711,938 A | * 12/1987 | Suka et al. | 526/87 |
| 4,946,891 A | * 8/1990 | Devona et al. | 526/88 X |
| 5,728,793 A | * 3/1998 | Kumagai et al. | 526/224 X |

FOREIGN PATENT DOCUMENTS

| | | |
|---|---|---|
| EP | 0926161 A1 | 11/1998 |
| EP | 1024149 A2 | 1/2000 |

OTHER PUBLICATIONS

J. Phys. Chem. 1996, 100, pp. 15503–15507, "Effects of Dissolved Gas on Emulsions, Emulsion Polymerization, and Surfactant Aggregation", by M. E. Karaman, B. W. Ninham and R. M. Pashley.

UDC 622.6921(571.1) Translation from Russian, "Study Of Emulsion Stability During Dehydration of Gas–Saturated Petroleum", by V. S. Skipin, Ye.A. Glovatskii.

Langmuir 1999, 15, pp. 1562–1569, "Direct Measurement of Hydrophobic Forces: A Study of Dissolved Gas Approach Rate, and Neutron Irradiation", by V.S.J. Craig, B.W.Ninham, and R.M. Pashley.

* cited by examiner

*Primary Examiner*—Fred Teskin
(74) *Attorney, Agent, or Firm*—Ronald D. Bakule

(57) ABSTRACT

A continuous process for preparing polymers, preferably emulsion polymers, with minimal fouling of the reactor is provided. The process is effected in a reactor which does not contain a gas phase, optionally by reducing the gas content of the reaction mixture.

3 Claims, No Drawings

CONTINUOUS PROCESS FOR PREPARING POLYMERS

CROSS REFERENCE TO RELATED PATENT APPLICATIONS

This is a non-provisional application of prior pending U.S. provisional application Ser. No. 60/190,618 filed Mar. 20, 2000.

This invention relates to a continuous process for preparing polymers and a method for the reduction of polymer fouling on reactor surfaces, especially in a continuous process for preparing emulsion polymers.

Polymers are typically prepared in batch, semi-continuous, or continuous processes. Such processes are susceptible to various degrees to polymer build-up or fouling on the reactor surfaces. Polymer fouling results in the need to shut the reactors down and clean the reactor surfaces which reduces available production time and may, for certain reactor geometries such as tubular reactors, be highly inconvenient.

European Patent Application 926 161 A discloses a continuous process for preparing polymers in a reactor having a non-cylindrical channel which provides low levels of fouling. Even lower levels of fouling are desired.

"Effects of Dissolved Gas on Emulsions, Emulsion Polymerization, and Surfactant Aggregation" by M. E. Karaman, et al. J. Phys. Chem, 100, 15503–15507(1996) discloses that the presence of dissolved gas in a batch polymerization has a role in emulsion stability and emulsion polymerization.

We have now discovered that minimizing, preferably eliminating, a separate gas phase in a continuous polymerization reactor reduces polymer fouling on the reactor surfaces.

STATEMENT OF THE INVENTION

According to a first aspect of the present invention there is provided a continuous process for preparing a polymer including continuously feeding at least one reaction mixture containing at least one monomer to a reactor wherein the reactor does not contain a gas phase; polymerizing the monomer in the reactor; and continuously removing the polymer from the reactor.

According to a second aspect of the present invention there is provided a method for reducing polymer fouling during a continuous process for preparing a polymer including continuously feeding at least one reaction mixture containing at least one monomer to a reactor wherein the reactor does not contain a gas phase; polymerizing the monomer in the reactor; and continuously removing the polymer from said reactor.

DETAILED DESCRIPTION

The present invention is directed to a process for preparing a polymer including feeding at least one reaction mixture containing at least one monomer to a reactor wherein the reactor does not contain a gas phase; and polymerizing the monomer in the reactor. Preferably, the present invention is directed to a continuous process for preparing a polymer including continuously feeding at least one reaction mixture containing at least one monomer to a reactor wherein the reactor does not contain a gas phase; polymerizing the monomer in the reactor; and continuously removing the polymer from the reactor. In the case of a continuous process the reactor may be a tubular reactor or channel whether, cyclindrical or non-cylindrical in cross-section. By "non-cylindrical" it is meant any shape whereby the reactant is exposed to a greater surface area for a given length than a cylindrical shape. Suitable non-cylindrical shapes of the channel are for example, oval, ellipse, square, triangular, and rectangular.

In a one embodiment a continuous process for preparing polymers includes continuously feeding at least one reaction mixture containing at least one monomer to at least one channel; optionally, continuously controlling the temperature of the channel by exposing the surface of the channel not exposed to the reactant to a temperature control medium; polymerizing the monomer in at least one channel; and continuously removing the polymer from at least channel; desirably the rate at which the at least one reaction mixture containing at least one monomer is fed to at least one channel containing polymer is controlled, such that the amount of monomer in the at least one channel does not exceed the amount that may be swollen into the polymer in the at least one channel.

The surface of the one or more channels not exposed to the reaction mixture containing at least one monomer may be exposed to a temperature control medium for the purpose of heating or cooling the reaction misture. The temperature control medium may be a solid, gas or liquid. A typical gas medium may be applied by simply exposing the channel to air. A liquid medium may be for example, water, brine, or glycol solvents such as ethylene glycol, diethylene glycol, propylene glycol, dipropylene glycol, and the like. A solid medium may be for example a refrigerated or an electrically heated metal plate. It is preferable that the temperature control medium be a liquid.

The process may be operated at any temperature. The temperature typically ranges from 0 to 350° C., preferably 1 to 200° C., more preferably 3 to 100° C. The process may be operated under vacuum as low as 25 mm Hg, or at pressures up to 5,000 psi. The flow rate through the channel for the process may range from 50 ml/min to 750 L/min.

Pockets of gas in the reactor have been observed as increased fouling regions in the reactor. Therefore, a distinct gas phase is prevented, in part, through reactor design so that pockets of gas are not maintained during the polymerization process; further, the amount of gas present in the reaction mixture desirably ranges from 0 to 100% of saturation at reaction conditions (i.e., no free gas phase), preferably 0 to 50% of saturation. Preheating feed streams, substituting gases, and reduced pressures (vacuum) may be used to remove gas from the reaction mixture containing at least one monomer being fed to one or more non-cylindrical channels. With pre-heating of the feed streams in a vented environment, the solubility of gas in the feed streams decreases, thereby lowering the amount of gas entering the reaction mixture. Sparging feeds with a gas such as Helium will displace the air normally present; Helium has an advantage in that its solubility varies only slightly with temperature.

The use of reduced pressure on the reaction mixture may be effected in various ways. In one embodiment vacuum may be maintained on the head space of a feed tank containing the reaction mixture. In a second embodiment gas permeable tubing may be used to deliver the reaction mixture to the reactor. This tubing may be placed in a reduced pressure enviroment such as a vacuum chamber, which allows gas present in the reaction mixture to be removed from the feed stream, through the tubing wall into the vacuum chamber. In a third embodiment a commercially available device for degassing may be used such as a Versator manufactured by The Cornell Machine Company. The Versator contains a degassing chamber which uses centrifugal force to increase the gas liquid interface which leads to increased degassing efficiency.

One advantage to using the Versator to degas is that it may also be used as a premixer to emulsify the feed streams when an emulsion polymerization is being carried out. The monomer emulsion formed by the degassed aqueous and monomer streams is very stable.

The channels may be constructed of any material suitable for forming into the desired shape and capable of providing sufficient heat transfer when exposed to a temperature control medium. Such materials are for example plastics such as polycarbonate and polypropylene, stainless-steel types 304 and 316; titanium, Monel, Incoloy 825, Hastelloy C, phosphor bronze, and cupronickel. In addition, the portion of the channel exposed to the reaction mixture containing at least one monomer may be coated with materials such as graphite or polytetrafluoroethylene to aid in flow.

When more than one channel is used, the channels may be the same or different length and may be run in series or in parallel. Each channel may also be run at different reaction conditions, such as at different temperature and pressure conditions.

At least one reaction mixture containing at least one monomer is fed to the channels and flows through the channels, preferably alternating with the temperature control medium. When the polymer is "grown out", the rate at which the reaction mixture is fed is critical. By "grown out" is meant that a polymer chain is formed in a first channel, followed by growing or extending the polymer chain in at least one channel. Therefore, during growing out of the polymer, there is polymer present in the at least one channel.

The reaction mixture containing at least one monomer flows through the channels at a rate sufficient to polymerize the monomer. In instances where a polymer product with a low polydispersity index is desired, the residence time of the reaction mixture containing at least one monomer is sufficient to yield a polydispersity index of less than 2.0. The residence time is typically less than 30 minutes, preferably less than 20 minutes. The flow rate may be adjusted based on the desired residence time in the channels and the total surface area of the channels. In general, the higher the total surface area of the channels, the faster the flow rate may be. The polymer is continuously removed through an outlet of the channels.

The channel may have one or more inlets. The reaction mixture containing at least one monomer may be fed into an inlet to the channel which has a different inlet within the channel, allowing a different reaction mixture containing at least one monomer to be fed at a different point in the process. Where more than one channel is used, the reaction mixture containing at least one monomer may be fed through a series of channels, for example the reaction mixture containing at least one monomer may be fed through one channel into a connected channel. There may be inlets between the connected channels to allow a different reaction mixture containing at least one monomer to be fed at a different point in the process to a separate channel. The different channels may be run at different temperature and pressure conditions. The reaction mixture containing at least one monomer may also be fed into inlets in parallel channels, whereby the reaction mixture containing at least one monomer flows through multiple channels at the same time. The parallel channels may have different inlets within the channels, allowing a different reaction mixture containing at least one monomer to be fed at a different point in the process to channels. The channels may be run at different temperature and pressure conditions. The channels may have one or more outlets. The polymer may be removed from the outlet of the channel, or the polymer may be fed from the outlet of the channel into one or more inlets of separate channels.

The process may be used for any type of polymerization, for example, emulsion polymerization, solution polymerization, or suspension polymerization. Polymerization may occur through addition or condensation reactions. Addition reactions include free radical, anionic, and cationic polymerizations. Emulsion polymerizations prepared by the process of this invention may be single stage or multi-stage. For multi-stage emulsion polymers, a first monomer emulsion may be polymerized in a channel and a second monomer emulsion may be fed either into a port in the channel, or into a port before or in a second connected channel. The first stage may also be pre-polymerized so that both the first stage and the second monomer emulsion are fed to a single channel. More flexibility in the process may be achieved by connecting up to ten channels either in a series or in parallel to the process.

In another embodiment the reactor consists of non-cylindrical channels and alternating channels for the temperature control medium which may be, for example, certain types of heat exchangers such as plate-frame, plate-fin, and spiral-plate heat exchangers. The plate-frame heat exchanger consists of standard plates which may be flat or corrugated. Corrugated plates are preferred due to improved mixing of the monomer with the other reactants. The plates serve as heat exchange surfaces and may be made of stainless-steel types 304 and 316; titanium, Monel, Incoloy 825, Hastelloy C, phosphor bronze, and cupronickel. The plates may be coated with materials such as graphite or polytetrafluoroethylene. The plates form alternating non-cylindrical channels for the reaction mixture containing at least one monomer and the temperature control medium to flow through. The plates are supported by a frame. Gaskets prevent leakage where the plate and frame meet. The frame may be made of clad stainless steel and enamel-coated mild steel.

The plate-fin heat exchanger is similar to the plate-frame heat exchanger, but has a stack of layers, each consisting of a corrugated fin between flat metal sheets. The sheets are sealed off on two sides by channels or bars to form passages for the flow of the reaction mixture containing at least one monomer and the temperature control medium. The temperature control medium may flow counter-current to or cocurrent with the reaction mixture containing at least one monomer.

The spiral-plate heat exchanger is made from a pair of plates rolled to provide long rectangular passages for the temperature control medium and the reaction mixture containing at least one monomer in counter-current or cocurrent flow.

The reaction mixture containing at least one monomer may be a mixture of at least one monomer and at least one initiator and solvent. Suitable solvents include, but are not limited to acetone, water, ethanol, methanol, butanol, isopropanol, propylene glycol monobutyl ether, ethylene glycol monobutyl ether, methylethyl ketone, dimethylformamide, and dimethylsulfoxide. Where emulsion polymerization is desired, surfactant may be combined with the monomer, the initiator, and water. By surfactant is meant a compound which reduces surface tension when dissolved in water or water solutions, or which reduces interfacial tension between two liquids, or between a liquid and a solid. Included in surfactants are wetting agents, and emulsifiers. Suitable surfactants include, but are not limited to anionic and nonionic emulsifiers such as alkali and ammonium alkyl sulfates, for example sodium lauryl sulfate, alkyl sulfonic acids, fatty acids, and oxyethylated alkyl phenols. The amount of surfactant used is typically 1 to 6% by weight, based on the weight of total monomer. The amount of water used is typically from 5 to 90% by weight, based on the weight of total monomer. Surfactant and water may also may be used in downstream dilutions of polymer emulsions made from the monomer emulsions. Suitable monomers include ethylenically unsaturated monomers such as, for example, acrylic esters such as methyl (meth)acrylate, ethyl acrylate, butyl (meth)acrylate, 2-ethylhexyl acrylate, decyl (meth)acrylate, hydroxyethyl (meth)acrylate, and hydroxypropyl (meth)acrylate; acrylamide or substituted acrylamides; styrene or substituted styrenes; ethylene, propylene, butadiene; vinyl acetate or other vinyl esters; vinyl monomers such as vinyl chloride, vinylidene chloride, N-vinyl pyrolidone; and acrylonitrile or methacrylonitrile. Copolymerizable ethylenically unsaturated acid monomers such as, for example, (meth)acrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, maleic anhydride and salts thereof may also be used. Preferred monomers are butyl acrylate, ethyl acrylate, 2-ethyl hexylacrylate, methyl methacrylate, styrene, and vinyl acetate. More preferred monomers are butyl acrylate, methyl methacrylate, and vinyl acetate. By (meth)acrylate is meant both acrylate and methacrylate monomers.

Electrolytes such as sodium hydroxide, sodium phosphate, disodium phosphate, sodium carbonate, and ammonia may be added to the reaction mixture containing at least one monomer. The electrolyte may be added at from 0.1 to 15 percent based on the total weight of the monomers in the reaction mixture.

A chelating agent such as ethylenediamine tetraacetic acid may also be added to the reaction mixture containing at least one monomer. The chelating agent may be added at from 0.01 to 2 percent based on the total weight of the monomers in the reaction mixture.

The method of initiation is not critical to the process of the invention. Preferably, initiation is effected through the use of thermal or redox initiation. Conventional free radical initiators such as, for example, peroxygen compounds including inorganic persulfate compounds such as ammonium persulfate, potassium persulfate, and sodium persulfate; peroxides such as hydrogen peroxide; organic hydroperoxides such as cumene hydroperoxide and t-butyl hydroperoxide; organic peroxides such as benzoyl peroxide, acetyl peroxide, lauroyl peroxide, peracetic acid, and perbenzoic acid (sometimes activated by a water-soluble reducing agent such as a ferrous compound or sodium bisulfite); as well as other free-radical producing materials such as 2,2'-azobisisobutyronitrile may be used, typically at a level of 0.05% to 3% by weight, based on the weight of total monomer. Redox systems using the same initiators coupled with a suitable reductant (activator) such as, for example, isoascorbic acid, sodium sulfoxylate formaldehyde, and sodium bisulfite may be used at similar levels. Ferrous sulfate and other metal ions may be used as promoters at similar levels. Other suitable methods of initiation such as the use of irradiation with Ultra Violet light, electron beam irradiation, gamma irradiation, Ultrasonic, or mechanical means to induce free-radical generation are deemed to be within the scope of this invention.

For an emulsion polymerization, the monomer emulsion must not phase separate or otherwise become unstable in a manner that interferes with the efficiency of the polymerization reaction. In cases where the monomer emulsion has the tendency to become unstable before polymerization, it may be premixed and thus stabilized before being fed to the channel. A mixer such as a static mixer or pre-mixer may be used in the process for this purpose.

EXAMPLES

Abbreviations used throughout are:

%=percent DI=deionized mm=millimeters ml=milliliters min=minutes ml/min=milliliters per minute L=liters For all Examples, monomer emulsions were prepared by admixing butyl acrylate, methyl methacrylate, methacrylic acid, an anionic surfactant, an electrolyte, a chelating agent, and water in a line. The premixer was set at a speed such that an emulsion was formed. All percents are by weight.

Example 1

A monomer mixture (46% butyl acrylate, 53% methyl methacrylate, 1% methacrylic acid) was fed at 58.5 g/min from a 3.6 L tank to an evacuated premixer (Cornell Model D-8 Versator with a vacuum of 55.9 mm(22 in) water). An aqueous mixture (1.4% anionic surfactant) was fed at 11.4 g/min from a 7.6 L tank to the pre-mixer. The pre-mixer was set to a speed such that a stable monomer emulsion was produced. A 20 L aqueous feed tank was used to feed hot DI water to the front of the process. A 10% ammonium persulfate catalyst solution was prepared. The solution was mixed well and fed to the catalyst feed tank. A 1.2% aqueous ammonia/13.8% sodium laurel sulfate buffer solution was prepared. The solution was mixed well and fed to the buffer feed tank. The aqueous feeds were fed through 18 feet of peroxide cured gas permeable tubing coiled in an evacuated chamber at 61.0 mm(24 in) water. The aqueous catalyst feed tanks were sparged with N2. The buffer feed tank was swept with N2.

DI water was heated to 95° C. A Tranter UFX-6 plate-frame heat exchanger system was utilized as the reactor. The water was pumped through the process lines in order to heat the system. The temperature for the "water-side" of the reactors was then set to 70° C. Tempered water flow through the "water-side" was begun. The reactor temperature was allowed to equilibrate.

The DI water flow was adjusted to 64.8 g/min. The catalyst pump was turned on to 5.68 ml/min and steam was injected into the catalyst line to preheat the mixture to 95° C. The buffer pump was turned on to 11.03 ml/min. The monomer emulsion feed was introduced before the reactor at a rate of 18.5 g/min. The temperature of the water in the heating bath that fed a pipe in pipe heat exchanger on the aqueous feed line was adjusted to insure that the temperature of the emulsion at the heat exchanger inlet was approximately 73° C. The monomer emulsion was fed continuously to the heat exchangers. The monomer was polymerized in the heat exchangers. Polymer was continuously removed from the heat exchangers and collected and cooled in the final product holding tank. When the volume was low in any of the feed tanks it was replenished with a charge equivalent to the original. After 4 hours of running, warm soapy water was pumped through the system in order to flush out any remaining emulsion. This was continued until the exiting liquid was clear.

A stable latex with a 17.9% solids content and a mean weight average particle diameter of 55 nm was obtained as a product. The polydispersity of the product was 1.06. Reaction totaled 100% conversion. The system was dismantled and the plates were weighed. The plates weighed 23 grams more than before the experiment.

Comparative Example A

A monomer mixture (46% butyl acrylate, 53% methyl methacrylate, 1% methacrylic acid) was fed at 58.5 g/min from a 3.6 L tank to a vented premixer (Cornell Model D-8 Versator with no vacuum applied). An aqueous mixture (1.4% anionic surfactant) was fed at 11.4 g/min from a 7.6 L tank to the pre-mixer. The pre-mixer was set to a speed such that a stable monomer emulsion was produced. A 20 L aqueous feed tank was used to feed hot DI water to the front of the process. A 10% ammonium persulfate catalyst solution was prepared. The solution was mixed well and fed to the catalyst feed tank. A 1.2% aqueous ammonia/13.8% sodium laurel sulfate buffer solution was prepared. The solution was mixed well and fed to the buffer feed tank. The aqueous feeds were fed through 18 feet of peroxide cured gas permeable tubing coiled in a vented chamber with no vacuum applied. The aqueous, catalyst feed tanks were sparged with N2. The buffer feed tank was swept with N2.

DI water was heated to 95° C. A Tranter UFX-6 plate-frame heat exchanger system was utilized as the reactor. The water was pumped through the process lines in order to heat the system. The temperature for the "water-side" of the reactors was then set to 70° C. Tempered water flow through the "water-side" was begun. The reactor temperature was allowed to equilibrate.

The DI water flow was adjusted to 64.8 g/min. The catalyst pump was turned on to 5.68 ml/min and steam was injected into the catalyst line to preheat the mixture to 95° C. The buffer pump was turned on to 11.03 ml/min. The monomer emulsion feed was introduced before the reactor at a rate of 18.5 g/min. The temperature of the water in the heating bath that fed a pipe in pipe heat exchanger on the aqueous feed line was adjusted to insure that the temperature of the emulsion at the heat exchanger inlet was approximately 73° C. The monomer emulsion was fed continuously to the heat exchangers. The monomer was polymerized in the heat exchangers. Polymer was continuously removed from the heat exchangers and collected and cooled in the final product holding tank. When the volume was low in any of the feed tanks it was replenished with a charge equivalent to the original. After 4 hours of running, warm soapy water was pumped through the system in order to flush out any remaining emulsion. This was continued until the exiting liquid was clear.

A stable latex with a 18.2% solids content and a mean weight average particle diameter of 56.5 nm was obtained as a product. The polydispersity of the product was 1.06. Reaction totaled 100% conversion. The system was dismantled and the plates were weighed. The plates weighed 49 grams more than before the experiment, i.e., more fouling was observed on the first plate channels for Comparative Example A than in Example 1 of this invention.

Example 2

A monomer mixture (46% butyl acrylate, 53% methyl methacrylate, 1% methacrylic acid) was fed at 58.5 g/min from a 3.6 L tank to an evacuated premixer (Cornell Model D-8 Versator with a vacuum of 55.9 mm (22 in) water). An aqueous mixture (1.4% anionic surfactant) was fed at 11.4 g/min from a 7.6 L tank to the pre-mixer. The pre-mixer was set to a speed such that a stable monomer emulsion was produced. A 20 L aqueous feed tank was used to feed hot DI water to the front of the process. A 10% ammonium persulfate catalyst solution was prepared. The solution was mixed well and fed to the catalyst feed tank. A 1.2% aqueous ammonia/ 13.8% sodium laurel sulfate buffer solution was prepared. The solution was mixed well and fed to the buffer feed tank. The aqueous feeds were fed through 18 feet of peroxide cured gas permeable tubing coiled in an evacuated chamber at 61.0 mm (24 in) water. The aqueous tanks were sparged with Helium. The buffer feed and catalyst tanks were swept with Helium.

DI water was heated to 95° C. A Tranter UFX-6 plate-frame heat exchanger system was utilized as the reactor. The water was pumped through the process lines in order to heat the system. The temperature for the "water-side" of the reactors was then set to 70° C. Tempered water flow through the "water-side" was begun. The reactor temperature was allowed to equilibrate.

The DI water flow was adjusted to 64.8 g/min. The catalyst pump was turned on to 5.68 ml/min. The buffer pump was turned on to 11.03 ml/min. The monomer emulsion feed was introduced before the reactor at a rate of 18.5 g/min. The temperature of the water in the heating bath that fed a pipe in pipe heat exchanger on the aqueous feed line was adjusted to insure that the temperature of the emulsion at the heat exchanger inlet was approximately 73° C. The monomer emulsion was fed continuously to the heat exchangers. The monomer was polymerized in the heat exchangers. Polymer was continuously removed from the heat exchangers and collected and cooled in the final product holding tank. When the volume was low in any of the feed tanks it was replenished with a charge equivalent to the original. After 4 hours of running, warm soapy water was pumped through the system in order to flush out any remaining emulsion. This was continued until the exiting liquid was clear.

A stable latex with a 17.1% solids content and a mean weight average particle diameter of 56 nm was obtained as a product. The polydispersity of the product was 1.05. Reaction totaled 100% conversion. The system was dismantled and the plates were weighed. The plates weighed 20 grams more than before the experiment.

Example 3

A monomer mixture (46% butyl acrylate, 53% methyl methacrylate, 1% methacrylic acid) was fed at 58.5 g/min from a 3.6 L tank to an evacuated premixer (Cornell Model D-8 Versator with a vacuum of 55.9 mm (22 in) water). An aqueous mixture (1.4% anionic surfactant) was fed at 11.4 g/min from a 7.6 L tank to the pre-mixer. The pre-mixer was set to a speed such that a stable monomer emulsion was produced. A 20 L aqueous feed tank was used to feed hot DI water to the front of the process. A 10% ammonium persulfate catalyst solution was prepared. The solution was mixed well and fed to the catalyst feed tank. A 1.2% aqueous ammonia/13.8% sodium laurel sulfate buffer solution was prepared. The solution was mixed well and fed to the buffer feed tank. The aqueous feeds were fed through 18 feet of peroxide cured gas permeable tubing coiled in an evacuated chamber at 24" water. The aqueous, catalyst feed tanks were sparged with N2. The buffer feed tank was swept with N2.

DI water was heated to 95° C. A Tranter UFX-6 plate-frame heat exchangers system was utilized as the reactor. The water was pumped through the process lines in order to heat the system. The temperature for the "water-side" of the reactors was then set to 70° C. Tempered water flow through the "water-side" was begun. The reactor temperature was allowed to equilibrate.

The DI water flow was adjusted to 64.8 g/min. The catalyst pump was turned on to 5.68 ml/min. The buffer pump was turned on to 11.03 ml/min. The monomer emulsion feed was introduced before the reactor at a rate of 18.5 g/min. The temperature of the water in the heating bath that fed a pipe in pipe heat exchanger on the aqueous feed line was adjusted to insure that the temperature of the emulsion at the heat exchanger inlet was approximately 73° C. The monomer emulsion was fed continuously to the heat exchangers. The monomer was polymerized in the heat exchangers. Polymer was continuously removed from the heat exchangers and collected and cooled in the final product holding tank. When the volume was low in any of the feed tanks it was replenished with a charge equivalent to the original. After 4 hours of running, warm soapy water was pumped through the system in order to flush out any remaining emulsion. This was continued until the exiting liquid was clear.

A stable latex with a 17.5% solids content and a mean weight average particle diameter of 55 nm was obtained as a product. The polydispersity of the product was 1.06.

Reaction totaled 100% conversion. The system was dismantled and the plates were weighed. The plates weighed 16 grams more than before the experiment.

What is claimed:

1. A continuous process for preparing a polymer comprising continuously feeding at least one reaction mixture containing at least one monomer to a reactor wherein said reactor comprises a non-cylindrical channel and wherein said reactor does not contain a gas phase;

polymerizing said monomer in said reactor; and continuously removing said polymer from said reactor.

2. A continuous process for preparing a polymer comprising continuously feeding at least one reaction mixture containing at least one monomer to a reactor wherein the amount of gas in said at least one reaction mixture does not exceed the solubility limit of said gas at any time in said reactor;

polymerizing said monomer in said reactor; and continuously removing said polymer from said reactor wherein said polymer is an emulsion polymer.

3. The process of claim 2 wherein said reactor comprises a non-cylindrical channel.

* * * * *